(12) United States Patent
Crowley et al.

(10) Patent No.: US 6,378,086 B1
(45) Date of Patent: Apr. 23, 2002

(54) METHOD AND SYSTEM FOR RECOVERING A COMPUTER SYSTEM FROM A LOADSOURCE LOCATED AT A REMOTE LOCATION

(75) Inventors: Thomas Richard Crowley; Michael Steven Faunce; Dennis R. Martin, all of Rochester; Michael James McDermott, Oronoco, all of MN (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 08/805,399

(22) Filed: Feb. 24, 1997

(51) Int. Cl.[7] .............................................. G06F 11/00
(52) U.S. Cl. ......................................................... 714/7
(58) Field of Search ..................... 395/182.03, 182.04, 395/182.05, 182.06, 182.07, 182.13, 182.12, 652; 711/162; 714/7

(56) References Cited

U.S. PATENT DOCUMENTS

| | | | | |
|---|---|---|---|---|
| 4,907,226 A | * | 3/1990 | Endo ...................... | 395/182.06 |
| 5,083,264 A | * | 1/1992 | Platteter et al. ......... | 395/182.06 |
| 5,159,671 A | * | 10/1992 | Iwami .................... | 395/182.05 |
| 5,187,792 A | * | 2/1993 | Dayan et al. ............. | 395/725 |
| 5,212,784 A | * | 5/1993 | Sparks ................... | 395/182.04 |
| 5,257,378 A | * | 10/1993 | Sideserf et al. ......... | 395/700 |
| 5,269,022 A | * | 12/1993 | Shinjo et al. ............. | 395/700 |
| 5,432,927 A | * | 7/1995 | Grote et al. ........... | 395/182.05 |
| 5,504,858 A | * | 4/1996 | Ellis et al. ............. | 395/182.04 |
| 5,519,869 A | * | 5/1996 | Payne et al. ................. | 395/700 |
| 5,530,801 A | * | 6/1996 | Kobayashi ............. | 395/182.04 |
| 5,544,347 A | * | 8/1996 | Yanai et al. ........... | 395/182.04 |
| 5,548,712 A | * | 8/1996 | Larson et al. .......... | 395/182.05 |
| 5,633,999 A | * | 5/1997 | Clowes et al. ......... | 395/182.04 |
| 5,657,439 A | * | 8/1997 | Jones et al. ............ | 395/182.05 |
| 5,659,748 A | * | 8/1997 | Kennedy ..................... | 395/652 |
| 5,734,818 A | * | 3/1998 | Kern et al. ............. | 395/182.04 |
| 5,742,792 A | * | 4/1998 | Yanai et al. ........... | 395/182.04 |

* cited by examiner

*Primary Examiner*—Robert Beausoleil
*Assistant Examiner*—Bryce Bonzo
(74) *Attorney, Agent, or Firm*—Bracewell & Patterson

(57) ABSTRACT

A method for recovering a computer system from a loadsource direct access storage device located at a remote location. In accordance with the method and system of the present invention, after a catastrophic damage and the installation of a local loadsource direct access storage device, an indicator within the local loadsource direct access storage device is set such that the local loadsource direct access storage device cannot be utilized for initial program load. Thereafter, the contents of the entire loadsource direct access storage device located at a remote location are copied to the replacement local loadsource direct access storage device. The indicator within the replacement local loadsource direct access storage device is reset such that the replacement local loadsource direct access storage device can be utilized for initial program load again. Finally, an initial program load is performed from the replacement local loadsource direct access storage device.

11 Claims, 4 Drawing Sheets

Fig. 2 *Prior Art*

METHOD AND SYSTEM FOR RECOVERING A COMPUTER SYSTEM FROM A LOADSOURCE LOCATED AT A REMOTE LOCATION

BACKGROUND OF THE INVENTION

1. Technical Field

The present invention relates to a method and system for recovering computer systems in general, and in particular to a method and system for recovering a computer system having a damaged local loadsource.

2. Description of the Prior Art

In order to ensure data recovery from site disasters such as fire, flood, earthquake, or even bomb at a computer site, all data on direct access storage devices (DASDs) of a main computer are usually duplicated at a remote location. Many computer systems such as AS/400™ manufactured by International Business Machines Corporation, support data duplication in the form of mirroring local DASDs to DASDs located at a remote location. By so doing, at least one extra set of data is available for quick recovery should a disaster occur at the main computer site.

One of the DASDs located at the main computer site, typically known as a local loadsource DASD, contains system code utilized to perform initial program load (IPL) of the computer system. Hence, the entire local loadsource DASD, containing both system configuration data and application data, must be mirrored on the DASD located at the remote site in order to provide a quick data recovery should the local loadsource DASD become damaged or is damaged for any reason. Be that as it may, most computer systems do not support remote IPL (i.e., IPL from a mirrored loadsource DASD at the remote site) because of cost and complexity.

For computer systems that do not support remote IPL, the following problems may occur. After the occurrence of a disaster at the main computer site, a replacement computer system must typically be utilized to make connection with the loadsource DASD at the remote site. However, the replacement computer system cannot perform an IPL from the loadsource DASD at the remote site. This is because in order to establish a communication between the replacement computer system and the loadsource DASD at the remote site, the replacement computer system must first be loaded with communication software, and the problem is that the preliminary IPL process has not proceeded far enough to load the communication software onto the replacement computer system. There are two current solutions to this problem. The first solution is to transfer the loadsource DASD from the remote site and then attach it to the replacement computer system at the main computer site. But in order for this type of local attachment to be possible, the loadsource DASD from the remote site must be restricted to a type and format that can be attached to the replacement computer system. Furthermore, the loadsource DASD from the remote site must be physically transported to the local site.

The second solution is to provide the replacement computer system with some special hardware and Read-Only Storage code that can establish communications with the loadsource DASD at the remote site. Then, when the local loadsource DASD is damaged, the replacement computer system can perform an IPL directly from the loadsource DASD at the remote site.

The two solutions mentioned above are not optimal because the first solution is rather time consuming and the second solution is quite expensive. Consequently, it would be desirable to provide an improved method and system for recovering a computer system having a damaged local loadsource DASD by utilizing a loadsource DASD located at a remote location.

SUMMARY OF THE INVENTION

In view of the foregoing, it is therefore an object of the present invention to provide an improved method and system for recovering computer systems.

It is another object of the invention to provide an improved method and system for recovering a computer system having a damaged local loadsource.

It is yet another object of the invention to provide an improved method and system for recovering a computer system having a damaged local loadsource by utilizing a loadsource located at a remote location.

In accordance with the method and system of the present invention, after a catastrophic disaster and the installation of a replacement local loadsource direct access storage device, an indicator within the replacement local loadsource direct access storage device is set, such that the local loadsource direct access storage device cannot be utilized for initial program load. Thereafter, the contents of the entire loadsource direct access storage device located at a remote location are copied to the replacement local loadsource direct access storage device. The indicator within the replacement local loadsource direct access storage device is reset such that the local loadsource direct access storage device can be utilized for initial program load again. Finally, an initial program load is performed from the replacement local loadsource direct access storage device.

All objects, features, and advantages of the present invention will become apparent in the following detailed written description.

BRIEF DESCRIPTION OF THE DRAWINGS

The invention itself as well as a preferred mode of use, further objects and advantage thereof, will best be understood by reference to the following detailed description of an illustrative embodiment when read in conjunction with the accompanying drawings, wherein.

DETAILED DESCRIPTION OF PREFERRED EMBODIMENT

The present invention may be executed in a midrange computer or a mainframe computer under a number of different operating systems. In addition, the computer may be a stand-alone system or part of a network such as a local-area network (LAN) or a wide-area network (WAN). For the purpose of illustration, a preferred embodiment of the present invention, as described below, is implemented on an AS/400™ computer, manufactured by International Business Machines Corporation.

Figure 1:
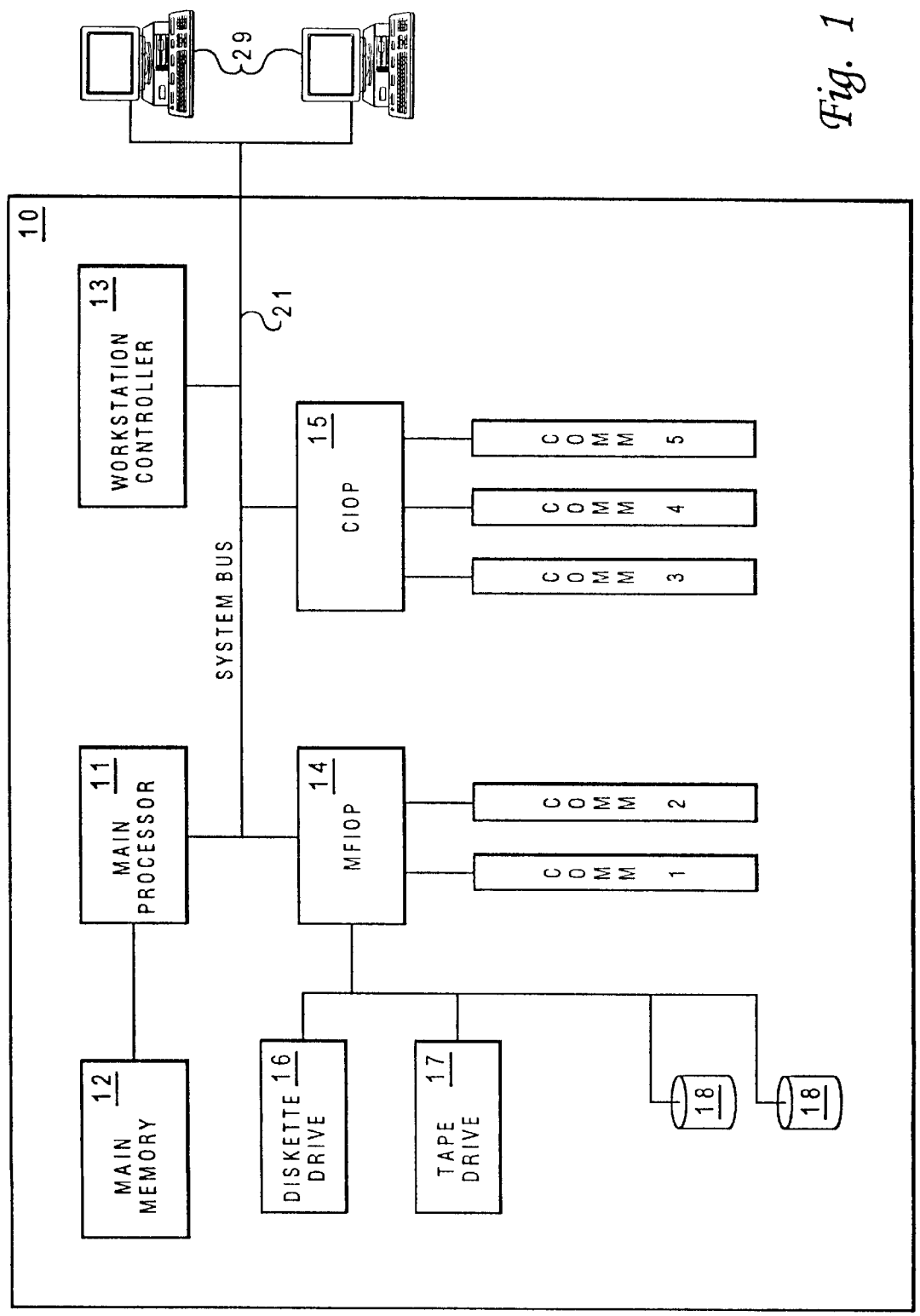
FIG. 1 is a block diagram of a computer system that may be utilized by a preferred embodiment of the invention.

Referring now to the drawings, and specifically to FIG. 1, there is illustrated a block diagram of a computer system that may be utilized by a preferred embodiment of the invention. Within computer box 10, main processor 11 is coupled to a main memory 12 and a multiple-function I/O processor (MFIOP) 14. Main processor 11 may include a single processor or multiple processors. Several peripheral storage devices such as diskette drive 16, tape drive 17, and direct access storage devices (DASDs) 18, are controlled by MFIOP 14. In addition, MFIOP 14 provides communications to other devices via communication ports such as COMM 1 and COMM 2.

Attached to system bus 21 are a workstation controller 13 and a communications I/O processor (CIOP) 15. Workstation controller 13 provides communications between main processor 11 and workstation(s) 29 that may be connected to the computer system. CIOP 15 provides communications to other devices via communication ports such as COMM3, COMM4, and COMM5.

Figure 2:
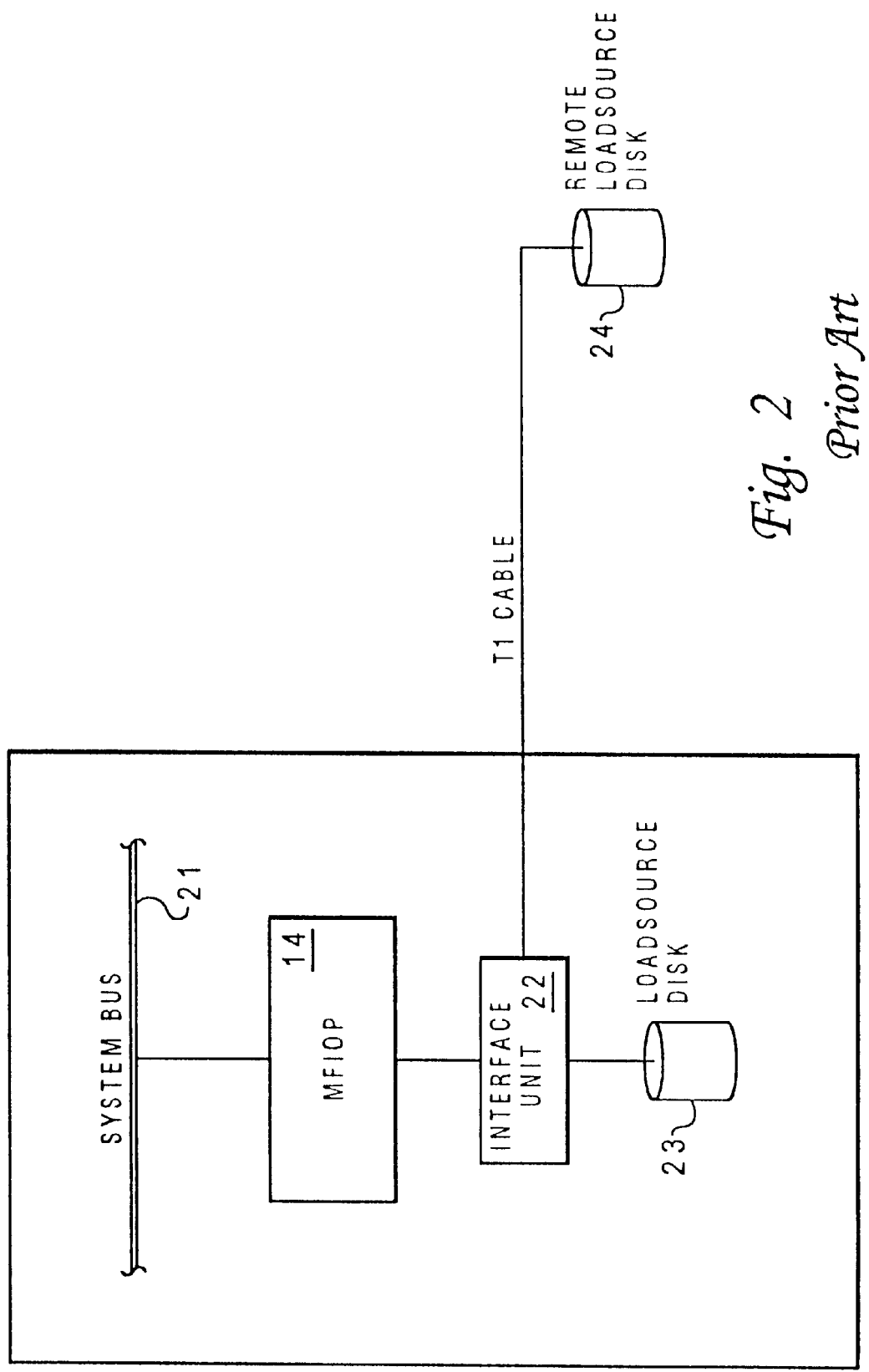
FIG. 2 is a block diagram of a remote source mirroring implementation according to the prior art.

With reference now to FIG. 2, there is depicted a block diagram of a remote source mirroring implementation according to the prior art. As shown, MFIOP 14 is connected to system bus 21 for providing communications between main processor 11 (not shown) and local loadsource DASD 23 as well as loadsource DASD 24 located at a remote site. For the sake of simplicity, only one loadsource DASD is shown for each of loadsource DASD 23 and loadsource DASD 24 in FIG. 2; in reality, however, several DASDs may be attached. Loadsource DASD 24 maintains a mirror image of the entire contents stored within loadsource DASD 23. Between MFIOP 14 and loadsource DASDs 23, 24, there is attached an interface unit 22 for maintaining the synchronization between DASD 23 and DASD 24. Loadsource DASD 24 may be connected to interface unit 22 via a standard communication cable such as a T1 cable. With this configuration, an initial program load (IPL) can be immediately performed by utilizing loadsource DASD 24 if loadsource DASD 23 is damaged due to whatever reason.

The configuration as shown in FIG. 2 provides a remote-IPL capability for the computer system. In fact, under this configuration, the computer system may be able to recover in a very short time after the damage of local loadsource DASD 23. However, this configuration also has some disadvantages, such as reducing the mirror protection level by allowing a single failure on any of system bus 21, MFIOP 14, or interface unit 22 to cause the computer system not be able to access data on either loadsource DASD 23 or loadsource DASD 24.

Figure 3:
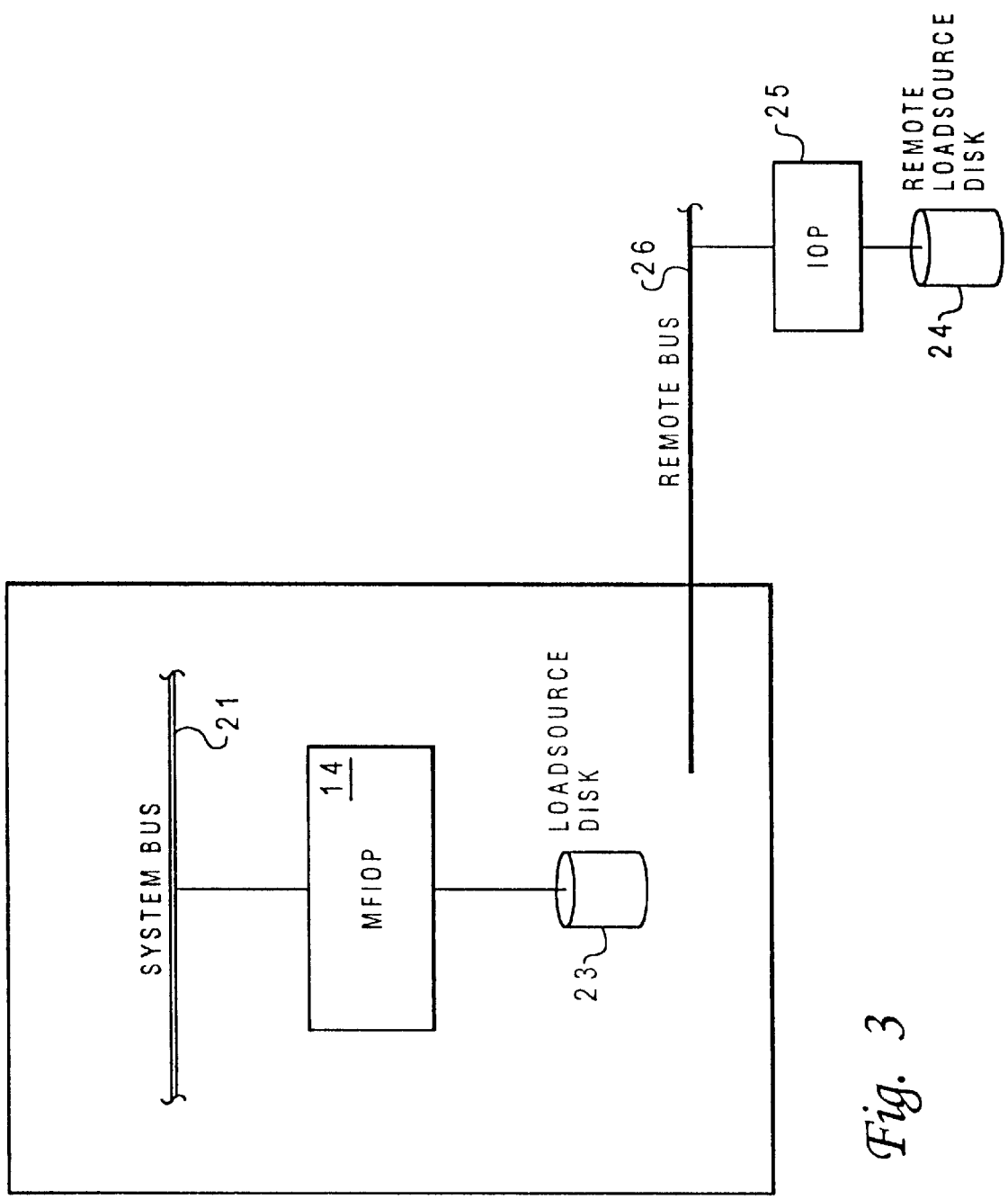
FIG. 3 is a block diagram of a remote source mirroring implementation in accordance with a preferred embodiment of the present invention.

Referring now to FIG. 3, there is depicted a block diagram of a remote source mirroring implementation in accordance with a preferred embodiment of the present invention. As shown, MFIOP 14 is connected to system bus 21 for providing communications between main processor 11 (not shown) and loadsource DASD 23. Loadsource DASD 24 located at a remote site is connected to remote bus 26 of the computer system via an I/O processor (IOP) 25. Similar to the prior art implementation of FIG. 2, loadsource DASD 24 also maintains a mirror image of the entire contents stored within loadsource DASD 23.

Figure 4:
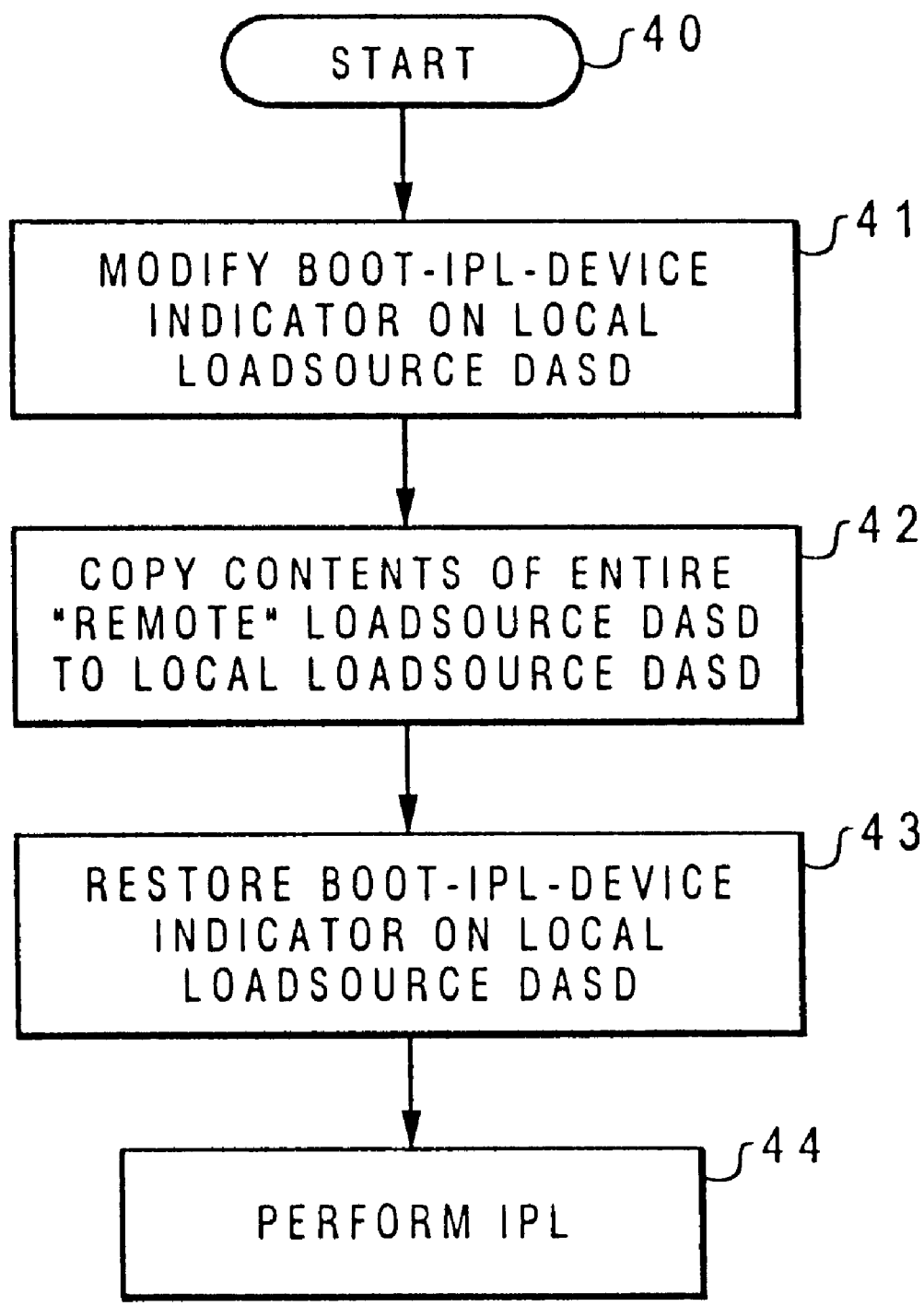
FIG. 4 is a high-level logic flow diagram of a method of recovering a computer system from a loadsource direct access storage device at a remote location, in accordance with a preferred embodiment of the present invention.

With reference now to FIG. 4, there is illustrated a high-level logic flow diagram of a method for recovering a computer system from a loadsource DASD at a remote location, in accordance with a preferred embodiment of the present invention. If the "original" local loadsource DASD is damaged, a new or replacement DASD may be needed as the local loadsource DASD if the previous local loadsource DASD is not reusable or salvageable. At this point, the computer system should be preliminary IPLed to a state in which the licensed internal software can utilize the main processor and local loadsource DASD as well as the remote bus and the loadsource DASD at the remote location, attached to the remote bus. All I/O operations on both local loadsource DASD and the loadsource DASD are put in a quiescent state to prevent any data from being modified by a program other than the recovery program or any other unwanted data modification.

Starting in block 40, a boot-IPL-device indicator within the local loadsource DASD is modified such that the local loadsource DASD cannot be utilized to perform IPL, as shown in block 41. After the loadsource DASD on the remote bus has been identified from the rest of the DASDs, the contents of the entire loadsource DASD at the remote site is copied to the local loadsource DASD, as depicted in block 42. Next, the boot-IPL-device indicator within the local loadsource DASD is restored such that the local loadsource DASD can be utilized for IPL once again, as illustrated in block 43. Finally, an IPL is performed from the newly installed local loadsource DASD, as shown in block 44.

As has been described, the present invention provides an improved method and system for recovering a computer system from a loadsource DASD located at a remote location. Under the present invention, a remote loadsource mirroring is provided across a remote bus. Under remote loadsource mirroring, the computer system no longer requires the loadsource DASD to be attached to the MFIOP. There are two distinct advantages by having the loadsource DASD attached to an IOP other than the MFIOP (and even on a different bus, such as a remote bus in this disclosure). The first advantage is the protection of the loadsource DASD against IOP and bus failures. The second advantage is the data protection against site disaster. Remote loadsource mirroring allows a complete set of DASDs to be mirrored at a remote site that is safe from a disaster at the main computer site. The distance between the main computer site and the remote site is limited by the length of a fiber optic bus, typically from 100 meters up to 2 kilometers.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, but not limited to, recordable type media such as floppy disks or CD ROMs, and transmission type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for recovering a computer system from a loadsource direct access storage device located at a remote location after catastrophic damage to a local loadsource direct access storage device, said method comprising the steps of:

replacing said damaged local loadsource direct access storage device with a replacement local loadsource direct access storage device;

setting an indicator on said replacement local loadsource direct access storage device such that said replacement local loadsource direct access storage device cannot be utilized for initial program load;

copying contents from said loadsource direct access storage device located at a remote location to said local loadsource direct access storage device;

resetting said indicator on said replacement local loadsource direct access storage device such that said replacement local loadsource direct access storage device can be utilized for initial program load; and performing an initial program load on said computer system from said replacement local loadsource direct access storage device.

2. The method for recovering a computer system from a loadsource direct access storage device located at a remote location according to claim 1, wherein said method further includes a step of stopping all I/O operations on said replacement local loadsource direct access storage device and said loadsource direct access storage device located at a remote location to prevent unwanted data modification.

3. The method for recovering a computer system from a loadsource direct access storage device located at a remote location according to claim 1, wherein said method further includes a step of replacing a damaged replacement local loadsource direct access storage device with an operational replacement local loadsource direct access storage device.

4. The method for recovering a computer system from a loadsource direct access storage device located at a remote location according to claim 1, wherein said method further includes a step of searching all direct access storage devices on a remote bus on said computer system to identify said loadsource direct access storage device located at a remote location.

5. A computer system capable of recovering from a loadsource direct access storage device located at a remote location after catastrophic damage to a local loadsource direct access storage device, said computer system comprising:

a replacement local loadsource direct access storage device connected to a system bus of said computer system in place of a damaged local loadsource direct access storage device;

an indicator on said replacement local loadsource direct access storage device such that said replacement local loadsource direct access storage device cannot be utilized for initial program load when said indicator is set;

transferring means for copying contents from said loadsource direct access storage device at said remote location to said replacement local loadsource direct access storage device via said remote bus; and initial program load means within said replacement local loadsource direct access storage device for initiating said computer system from said replacement local loadsource direct access storage device after said indicator has been reset.

6. The computer system capable of recovering from a loadsource direct access storage device located at a remote location according to claim 5, wherein said replacement local loadsource direct access storage device and said loadsource direct access storage device located at a remote location may be comprised of different type and format.

7. The computer system capable of recovering from a loadsource direct access storage device located at a remote location according to claim 5, wherein said transferring means further includes a fiber optic cable.

8. A computer program product residing on a computer usable medium for recovering a computer system from a loadsource direct access storage device located at a remote location after catastrophic damage to a local loadsource direct access storage device, said computer program product comprising:

program code means for switching control from said damaged local loadsource direct access storage device to a replacement local loadsource direct access storage device;

program code means for setting an indicator on a replacement local loadsource direct access storage device such that said replacement local loadsource direct access storage device cannot be utilized for initial program load;

program code means for copying contents from said loadsource direct access storage device located at a remote location to said replacement local loadsource direct access storage device;

program code means for resetting said indicator on said replacement local loadsource direct access storage device such that said replacement local loadsource direct access storage device can be utilized for initial program load; and program code means for performing an initial program load on said computer system from said replacement local loadsource direct access storage device.

9. The computer program product residing on a computer usable medium for recovering a computer system from a loadsource direct access storage device located at a remote location according to claim 8, wherein said computer program product further includes a program code means for stopping all I/O operations on said replacement local loadsource direct access storage device and said loadsource direct access storage device to prevent unwanted data modification.

10. The computer program product residing on a computer usable medium for recovering a computer system from a loadsource direct access storage device located at a remote location according to claim 8, wherein said computer program product further includes a program code means for replacing a damaged replacement local loadsource direct access storage device with an operational replacement local loadsource direct access storage device.

11. The computer program product residing on a computer usable medium for recovering a computer system from a loadsource direct access storage device located at a remote location according to claim 8, wherein said computer program product further includes a program code means for searching all direct access storage device to identify said loadsource direct access storage device.

* * * * *